Figure 1:
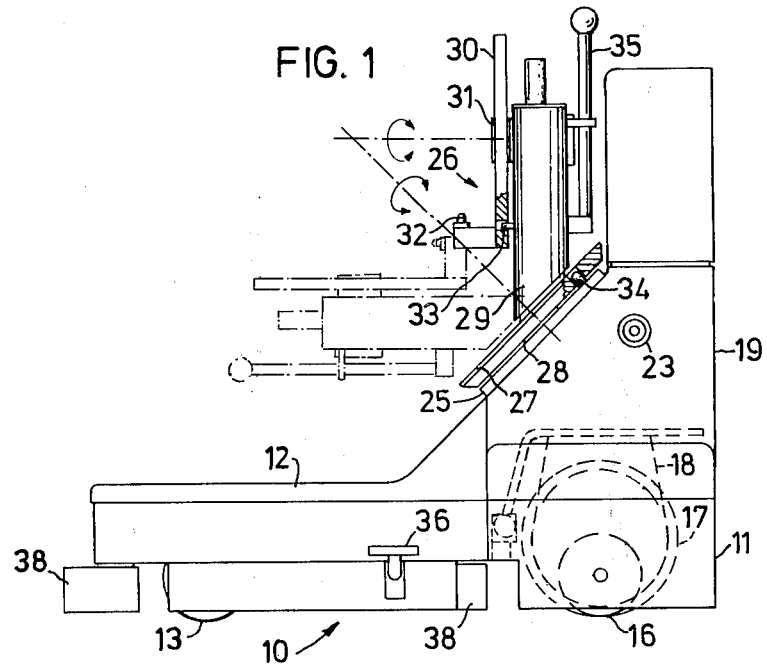

United States Patent [19]
Perhed

[11] 4,023,639
[45] May 17, 1977

[54] REMOTE-CONTROLLED, MOTOR-DRIVEN TRANSPORT CAR FOR TRANSPORTING MOTORS DURING ASSEMBLY

[75] Inventor: Per-Gunnar Arthur Perhed, Skovde, Sweden

[73] Assignee: AB Volvo, Goteborg, Sweden

[22] Filed: July 7, 1975

[21] Appl. No.: 593,456

[30] Foreign Application Priority Data
July 11, 1974 Sweden .............................. 7409136

[52] U.S. Cl. ..................................... 180/21; 29/824; 180/89.1; 214/1 Q; 214/1 QF; 248/179; 248/183; 269/55

[51] Int. Cl.² ........................................ B62D 61/10

[58] Field of Search ........... 180/98, 21, 25 R, 26 R, 180/26 A, 27, 1 R; 214/89 R, 1 QF, 1 Q, 330, 75 G; 29/200 J, 200 P, 208; 269/55, 56; 248/183, 179

[56] References Cited
UNITED STATES PATENTS

| | | | |
|---|---|---|---|
| 1,384,087 | 7/1921 | Purdy | 180/21 |
| 3,231,109 | 1/1966 | Bengel | 214/75 G |
| 3,598,196 | 8/1971 | Ballantyne | 180/98 X |
| 3,675,914 | 7/1972 | Douglass | 73/116 X |

FOREIGN PATENTS OR APPLICATIONS

| | | | |
|---|---|---|---|
| 1,552,649 | 11/1969 | Germany | 269/55 |
| 888,780 | 2/1962 | United Kingdom | 214/1 Q |

Primary Examiner—Joseph F. Peters, Jr.
Assistant Examiner—John P. Silverstrim
Attorney, Agent, or Firm—Young & Thompson

[57] ABSTRACT

A transport car for transporting motor parts or complete motors along an assembly path consisting of sequential working stations. The car has a base frame supporting a signal receiver and a fixture for the motor parts or the motor. The base frame has a main section provided with at least two wheels and a support section projecting out from this main section and having a smaller width than the main section and having at least one wheel at or near its outer end. The fixture is arranged so that a motor carried by it is situated at one side of the main section on the same side as the support section.

1 Claim, 2 Drawing Figures

REMOTE-CONTROLLED, MOTOR-DRIVEN TRANSPORT CAR FOR TRANSPORTING MOTORS DURING ASSEMBLY

The present invention relates to a transport car for transporting motor parts or complete motors along a path to sequential working stations, said transport car comprising a base frame having at least three wheels, at least one of which is steerable and at least one of which is driven by a motor, a signal receiver which is arranged to receive signals from a signal transmitting arrangement which operates along said path in order to regulate the operating state and running direction of the car in relation to the signals from the signal transmitting arrangement, and a fixture which is carried by the base frame, said fixture being for the motor parts or the motor.

It is previously known, for example by U.S. Pat. No. 3,968,559, to, in automobile assembly, break up the generally used assembly line into a plurality of individual cars of the kind disclosed above and guide the same along the assembly path and, when necessary, guide them away from the path to adjacent stations and, from said stations, back to the assembly path. In this manner the rigid working pace which prevails over an assembly line is, despite mechanisation, eliminated and the human being is relieved of his role as an integral component in the machine which is constituted by an assembly line. In this manner cooperation between several workers in groups is made possible and further advantages are gained as well.

The to date known cars for the new technique of assembling automobiles are primarily intended for the assembly of chassis and body and the joining together of said parts. The cars have a base frame which is adapted to the size of the automobile, said base frame having a rectangular shape on which various fixtures are arranged. Due to their size and shape, said cars are not suited for use in the assembly of motors.

The purpose of the present invention is to achieve a transport car of the kind disclosed in the preamble, said car being especially adapted for the transportation of motor parts and complete motors between the various working stations situated along the assembly path.

According to the invention, this is achieved by means of the base frame of the car having a main section provided with at least two wheels and a support section projecting out from said main section, said support section having a smaller width than the main section and having at least one wheel at or near its outer end and by means of the fixture being so arranged that a motor carried by the same is to a larger extent situated at one side of the main section on the same side as the support section.

By means of this design, the car can be made small and compact and still provide sufficient stability. The support section which stabilizes that side of the car towards which the motor projects, can be designed to be so narrow that it does not prevent the assembly-man from coming sufficiently close to the motor. In this manner said assembly-man is provided with a comfortable working position.

In a preferred embodiment of the car according to the invention, the base frame is T shaped and the support section projects outwards from the middle of the main section. The outer end of the support section forms the front end of the car and the fixture is arranged on the main section directly in front of the support section. The motor can then be easily reached from both sides of the car and the upper side of the support section can be designed as a trough for the collection of, for example, spilled oil from the motor or nuts and bolts which are dropped during assembly.

Figure 2:
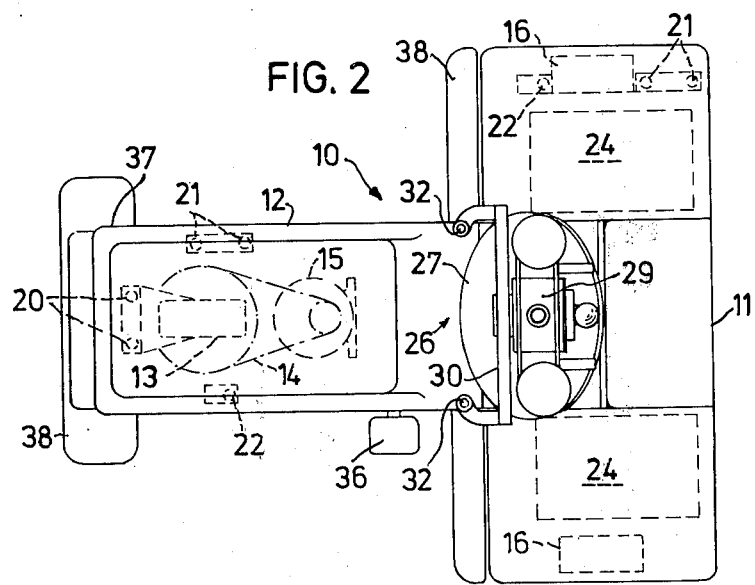

The car according to the invention is described in more detail below with reference made to an embodiment shown in the accompanying drawing in which FIG. 1 is a schematic side view of a car according to the invention and FIG. 2 is a view of the car shown in FIG. 1 as seen from above.

The illustrated car has a T-shaped base frame 10 comprising a main section 11 and a support section 12 which projects outwards centrally from said main section. A guide wheel 13 is arranged in the vicinity of the front end of the support section 12, said guide wheel being able to be pivoted around a vertical axle. The guide wheel is coupled to a guide motor 15 by means of a chain or belt 14. The main section 11 has two outer, freely rotatable support wheels 16 and a larger resiliently suspended drive wheel 17 arranged between said support wheels. The drive wheel 17 is coupled to a drive motor (not shown here) by means of a chain 18. The need for a differential gear is eliminated by the arrangement described above.

A frame 19 is arranged centrally on the main section 11 of the base frame said frame 19 containing the electronic steering arrangement (not shown here) for the car. Said electronic steering arrangement controls the guide motor and the drive motor of the car via an electric control wire which is arranged in the floor of the same. The signals from the control wire are picked up by various antennae 20, 21 and 22. The antennae 20 are control antennae which swing concurrently with the guide wheel 13. Antennae 21 are start and stop antennae and antennae 22 are registration antennae. The frame 19 has a control lever (not shown here) for manual manoeuvring of the car and a charge output 23 for charging the batteries 24 which are arranged in the base frame on both sides of the frame 19.

The frame 19 supports a motor fixture 26 on a plate 25 which inclines towards the support section 12 at a 45° angle. Said motor fixture 26 comprises an index plate 27 which is attached to a shaft 28 which is rotatably arranged in the plate 25. The motor fixture further comprises a support means 29 for an attachment plate 30 which is attached to a shaft 31 which is rotatably arranged in the support means 29. The motor is suspended on the attachment plate 30 in the rear plane of the block by means of attachments 32 and bolts (not shown here). By means of this arrangement the motor can be rotated around its longitudinal axis during assembly by means of turning the attachment plate 30. Furthermore the motor can be positioned vertically with its front end turned upwards by means of turning the index plate 27. The support means 29 then assumes the horizontal position shown in FIG. 1 by means of dotted lines. By means of arranging the shafts 28 and 31 in such a way that their geometric axes intersect each other in or near the centre of gravity of the motor, the motor becomes easy to turn and the height change during adjustment becomes insignificant. Distinctive assembly positions are obtained by means of locking arrangements 33 and 34 whereby a lever 35 regulates engagement for locking arrangement 33 and a pedal 36 regulates engagement for locking arrangement 34.

By means of the arrangement described above the motor will be situated above the support section 12 in all assembly positions. The narrow width of the support section results in the motor being easily accessible for an assembly man standing on one side of the car. The upper side of the support section 12 can as is indicated by 37 in FIG. 2, be designed as a trough for the collection of spilled oil or nuts and bolts, etc. which are dropped during assembly.

The car is provided with collision protection in the driving direction as is shown by 38.

Naturally, the shape of the car is not restricted to the above-described T-shape. Rather it is possible to, within the framework of the invention, conceive of an assymmetrical shape, i.e. in which the support section 12 is offset towards one of the sides of the main section 11. An L-shaped base frame can also be used.

What I claim is:

1. A transport car for transporting motor parts or a complete motor along a path to sequential working stations and for supporting said motor parts or motor during various working operations, said transport car comprising a base frame having a main section provided with at least two wheels and a support section projecting out from said main section, said support section having a smaller width than the main section and being provided with at least one wheel adjacent its outer end, at least one of said two wheels and said one wheel being driven and at least one being steerable, and a fixture for releasably securing said motor parts or motor on said car, said fixture being mounted on the base frame and being adjustable for varying the angular position of said motor parts or motor in relation to the base frame, said fixture being mounted such that said motor parts or motor is situated at one side of the main section on the same side as the support section, said fixture comprising an attachment plate to which the rear plane of the motor block is arranged to be attached, said attachment plate being rotatable around a horizontal rotary shaft which extends parallel with the longitudinal axis of the support section, the bearing of the attachment plate being carried by an inclined rotatable index plate, the rotary axis of which lies in a vertical plane parallel with the longitudinal axis of the support section and inclines toward one side of the support section at a 45° angle.

* * * * *